United States Patent

[11] 3,611,120

| [72] | Inventor | Friedrich M. O. Forster<br>Der Schoene Weg 144, 741 Reutlingen, Germany |
|---|---|---|
| [21] | Appl. No. | 14,752 |
| [22] | Filed | Feb. 24, 1970 |
| [45] | Patented | Oct. 5, 1971<br>Continuation of application Ser. No. 641,658, May 26, 1967. |

[54] EDDY CURRENT TESTING SYSTEMS WITH MEANS TO COMPENSATE FOR PROBE TO WORKPIECE SPACING
6 Claims, 12 Drawing Figs.

[52] U.S. Cl. .................................................. 324/37
[51] Int. Cl. .................................................. G01r 33/12
[50] Field of Search .................................. 324/34, 37, 40

[56] References Cited
UNITED STATES PATENTS

| 1,742,990 | 1/1930 | Gokhale | 324/37 |
| 1,801,328 | 4/1931 | Burrows | 324/37 |
| 2,162,710 | 6/1939 | Gunn | 324/37 |
| 2,706,805 | 4/1955 | Clewell | 324/40 |
| 2,921,298 | 1/1960 | Jackson | 324/40 |
| 3,247,453 | 4/1966 | Quittner | 324/37 |
| 3,271,662 | 9/1966 | Quittner | 324/40 |
| 3,281,667 | 10/1966 | Dobbins et al. | 324/40 |
| 3,359,495 | 12/1967 | McMaster et al. | 324/40 |
| 3,502,968 | 3/1970 | Tobin, Jr. et al. | 324/40 |
| FOREIGN PATENTS | | | |
| 631,987 | 11/1949 | Great Britain | 324/40 |
| 652,471 | 12/1964 | Belgium | 324/37 |
| 1,255,436 | 1/1961 | France | 324/37 |

*Primary Examiner*—Rudolph V. Rolinec
*Assistant Examiner*—R. J. Corcoran
*Attorney*—Dan R. Sadler

ABSTRACT: A nondestructive testing system is disclosed for inspecting the surface of a workpiece for hidden defects. The system includes a probe for creating eddy currents in the surface and precisely resolving the fields which are reradiated therefrom. The probe includes a single primary winding for creating the driving or current inducing field and a pair of differential pickup windings which are responsive to variations in the eddy currents at two different locations whereby very small defects can be resolved.

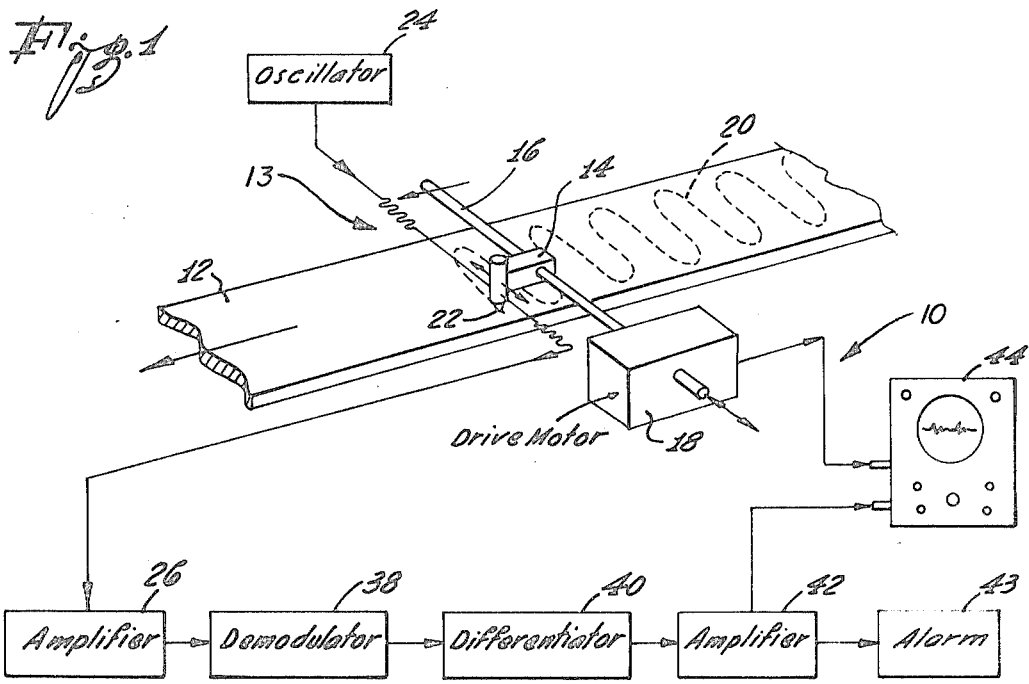
Fig. 1
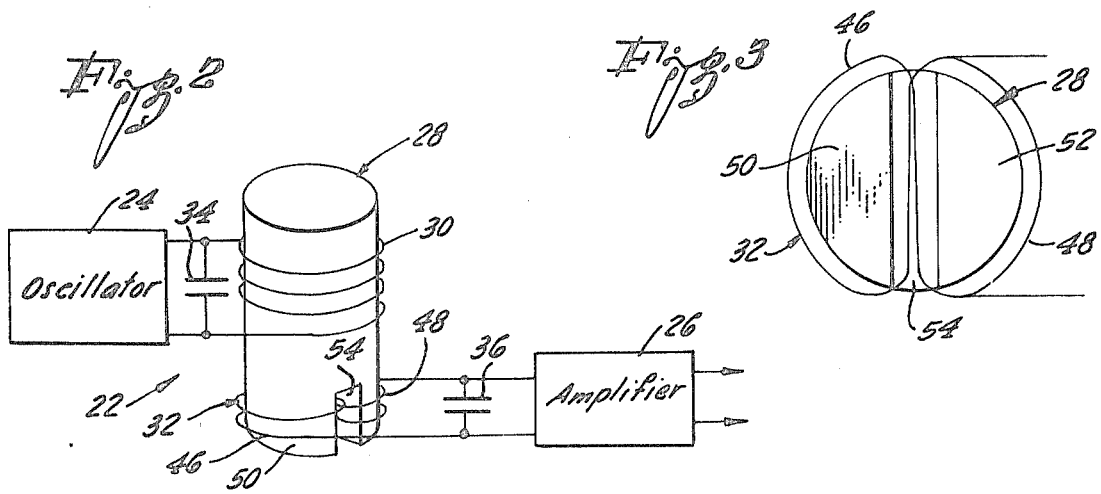
Fig. 2
Fig. 3
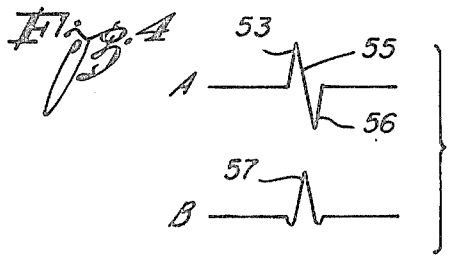
Fig. 4
INVENTOR:
Friedrich M.O. Förster
ATTORNEY

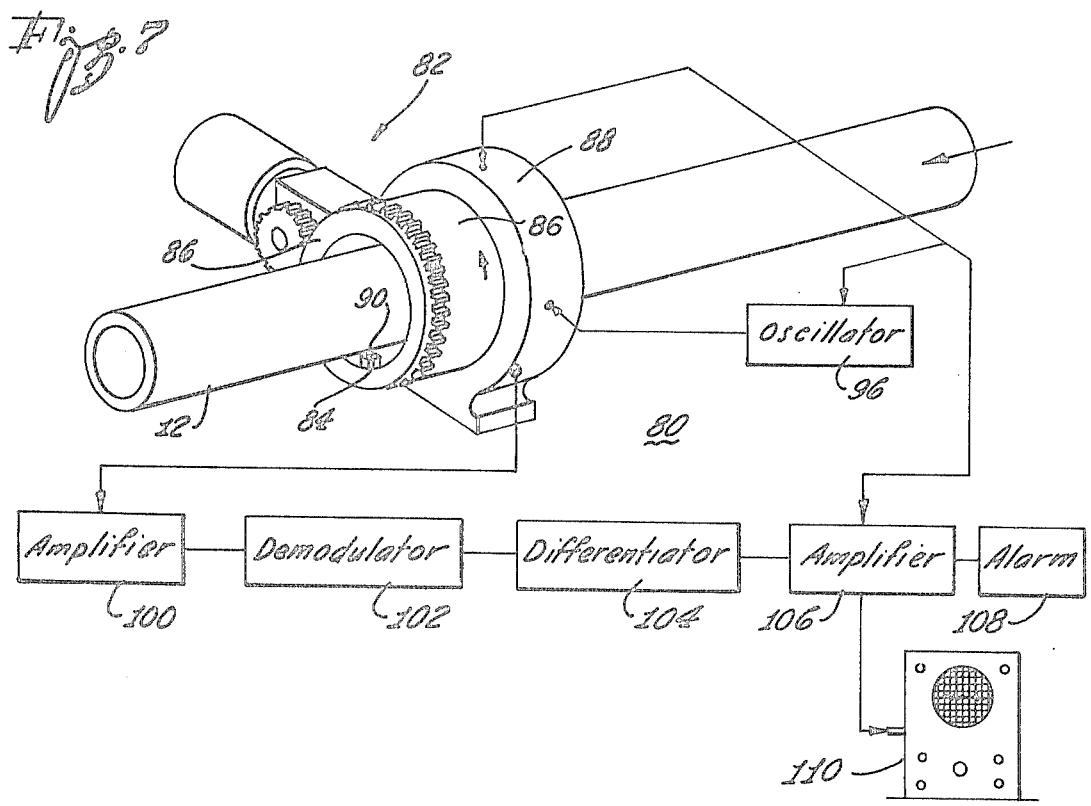
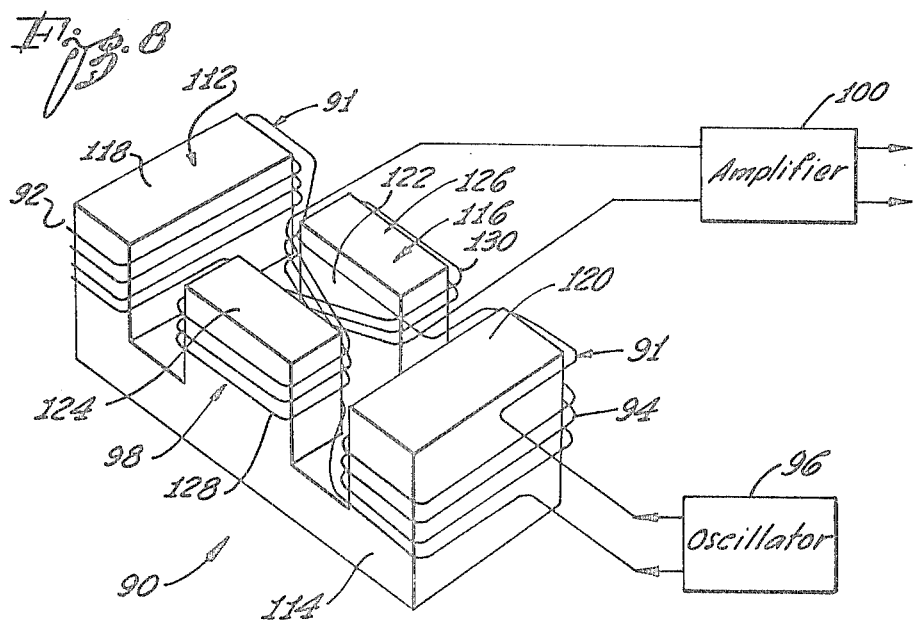

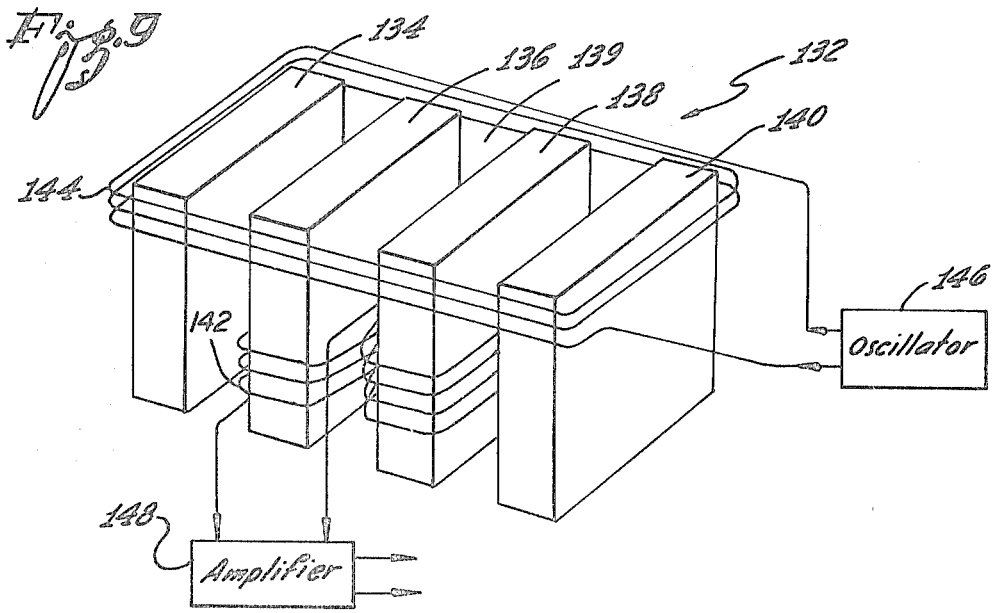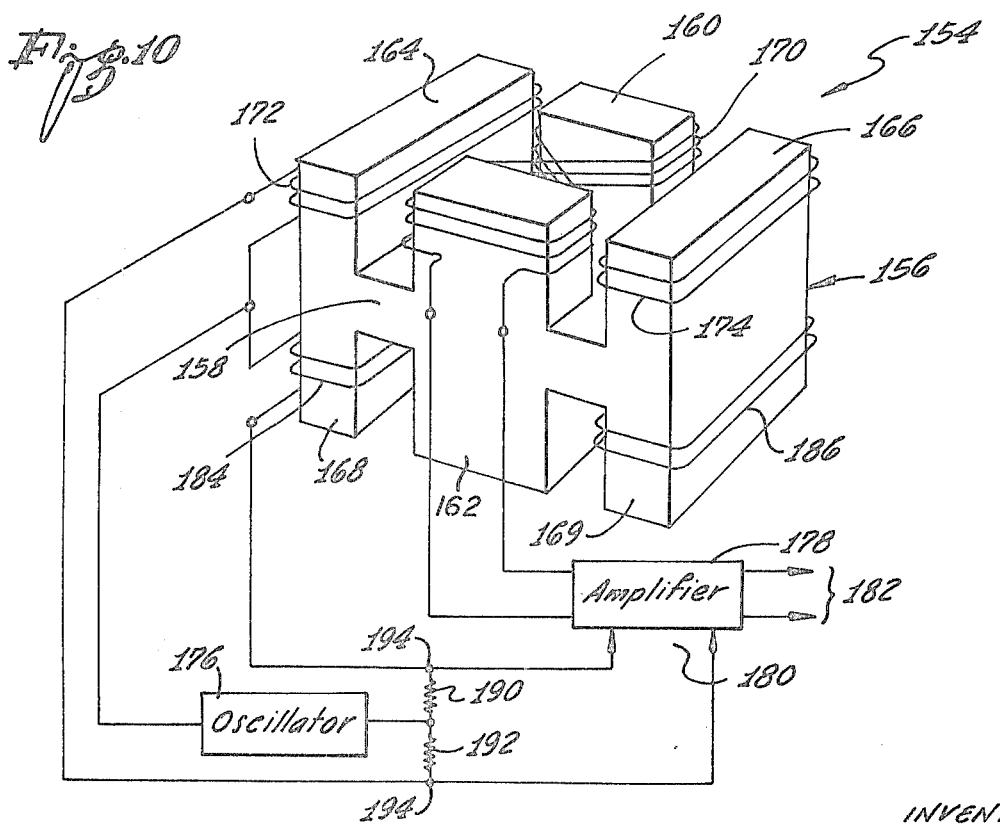

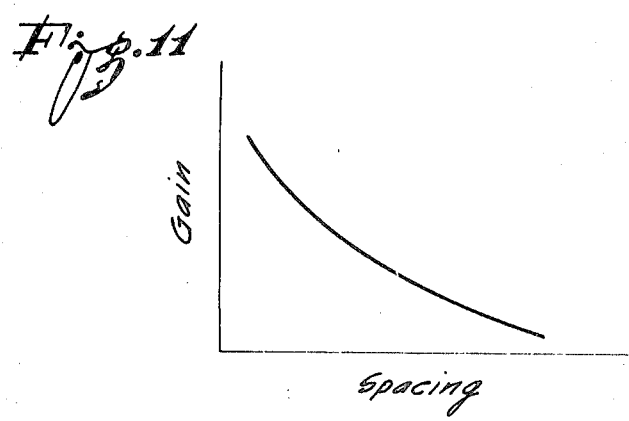
Fig. 11
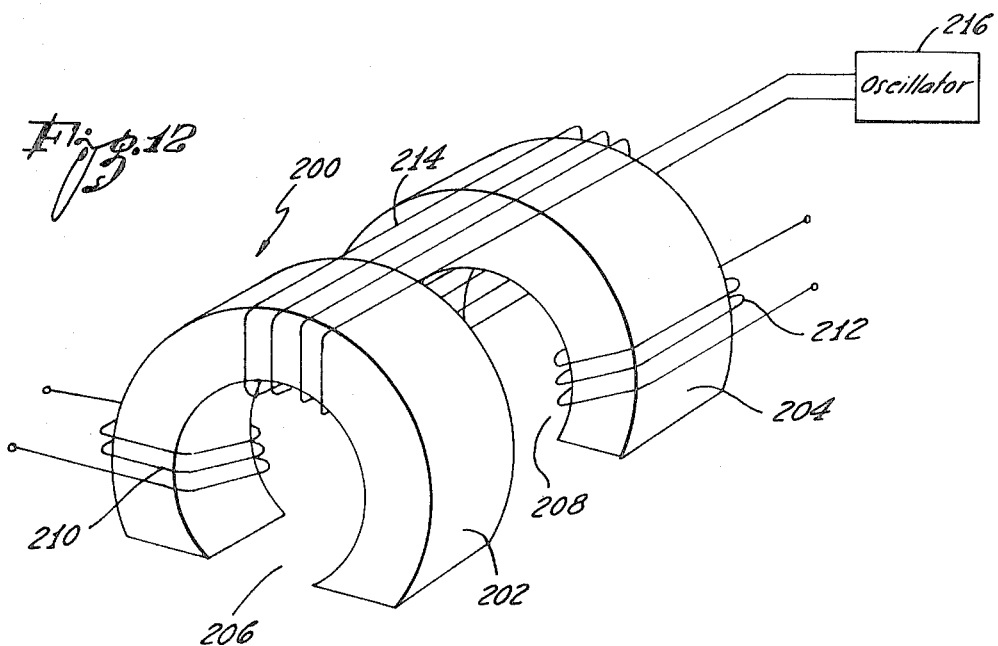
Fig. 12
INVENTOR:
Friedrich M.O. Förster
ATTORNEY

EDDY CURRENT TESTING SYSTEMS WITH MEANS TO COMPENSATE FOR PROBE TO WORKPIECE SPACING

CROSS REFERENCE TO RELATED APPLICATIONS

This is a streamlined continuation of copending application Ser. No. 641,658 filed May 26, 1967 for an Eddy Current Nondestructive Testing System and Pickup Probe for Use Therewith on behalf of Friedrich M. O. Forester. In the eddy current type of nondestructive testing an alternating magnetic field extends into the workpiece and creates a plurality of eddy currents that circulate within the workpiece. Normally the currents are of a frequency which confines them to a relatively thin volume immediately adjacent to the surface of the workpiece. If the volume of material penetrated by the eddy current is essentially homogenous the eddy currents distribute themselves in a pattern that is of a corresponding nature. However if there is an electrical discontinuity within this volume (for example, a crack, inclusion, and/or variation in the hardness or material composition etc.) there are corresponding variations in the shape of the pattern, phase and/or magnitude of the eddy currents etc. Accordingly, by observing these variations in the eddy currents it is possible to identify variations or defects in the workpiece. Heretofore the eddy currents have been produced by a search unit or probe which scans across the surface of the workpiece. The search unit has included at least one substantially cylindrical coil energized by a relatively high frequency signal whereby a high frequency magnetic field is produced in the workpiece. The eddy currents which are produced by the field produce corresponding or secondary signals in the driving coil or in a secondary coil. By observing the magnitude, phase etc. of these secondary signals, it is possible to locate defects and/or variations in the workpiece. Because of the geometry of these prior coils, the eddy currents have inherently been very extensive and have covered a relatively wide surface area. For example, the patterns of the eddy currents have extended over an area having a diameter may times that of the probe. As a consequence relatively small but serious defects have produced relatively small output signals. These small defects have very frequently been missed because of the inability to distinguish between the signals and the back ground noise. Conversely it has also been found that several small and immaterial irregularities may have a cummulative effect on the wide ranging eddy currents whereby the output signals appear to have a magnitude or phase corresponding to a single large defect of objectionable proportions. As a result, heretofore, it has been extremely difficult, if not impossible, to accurately and reliably identify certain types of small defect and/or to distinguish between acceptable irregularities and objectionable defects.

The present invention provides means for overcoming the foregoing difficulty. More particularly the present invention provides an eddy-current-testing system capable of locating minute defects, such as fine cracks in wires of small diameter and/or distinguishing between an objectionable defect and several closely spaced immaterial variations. This is accomplished by providing a search unit or probe wherein an essentially focused magnetic field is produced in the workpiece to produce eddy current and/or the characteristics of the pickup probe are essentially focused so as to be very sensitive to very minute variations in the eddy currents.

In the limited number of embodiments disclosed herein an eddy current probe is provided which has a core of magnetic material divided into separate portions. One or more windings are provided on the different portions of the core whereby the probe is effective to differential between the eddy currents generated within the workpiece at two closely spaced locations. As a consequence when the dividing line between these different locations pass over even a relatively small defect or irregularity a major change is produced in the secondary signal.

These and other features and advantages of the present invention will become readily apparent from the following detailed description of a limited number of embodiments thereof particularly when taken in connection with the accompanying drawings wherein like reference numerals refer to like parts and wherein:

FIG. 1 is a combination perspective view and block diagram of a nondestructive testing system embodying one form of the present invention;

FIG. 2 is a perspective view of the pickup probe employed in the system of FIG. 1 and a block diagram of a portion of the system of FIG. 1;

FIG. 3 is an end view of the pickup probe of FIG. 2;

FIGS. 4A and 4B are graphs representing certain operating characteristics of the pickup probe;

FIG. 7 is a perspective view and block diagram similar to FIG. 1 but showing another nondestructive testing system embodying a different form of the present invention;

FIG. 8 is a perspective view of the pick up probe employed in the system of FIG. 6 and a block diagram of a portion of the system;

FIG. 9 is a perspective view of another form of pickup probe similar to that in FIG. 7 but embodying a different form of the present invention;

FIG. 10 is a perspective view of another form of a pickup probe and a portions of a system embodying a further form of the present invention;

FIG. 11 is a graph illustrating one of the operating characteristics of the system of FIG. 9, and FIG. 12 is a perspective view of another form of pickup probe embodying another form of the present invention.

Figure 5:
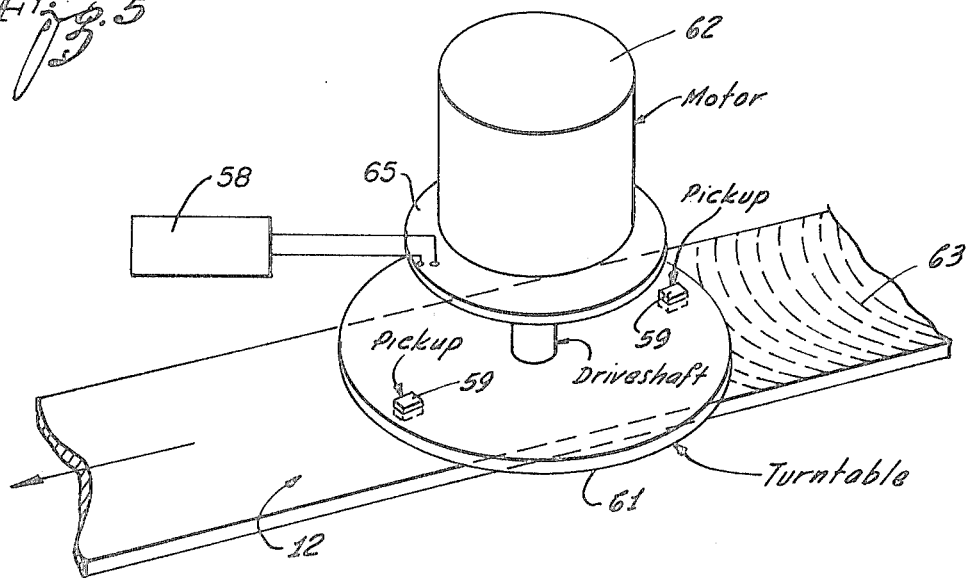
FIG. 5 is a perspective view, similar to FIG. 1 but showing a nondestructive testing system embodying a different form of the invention.

Referring to the drawings in more detail and particularly to FIGS. 1 through 4 the present invention is particularly adapted to be embodied in an eddy current test system 10 for testing workpieces 12 for discontinuities, such as defects like pits, cracks (particularly those in or near the surface). Although this system 10 is capable of detecting large discontinuities as well become apparent subsequently, it can be adapted to detect very small discontinuities.

The system 10 includes an inspection station 13 having a search unit 14 adapted to be positioned adjacent to the surface of the workpiece 12. The search unit 14 may be manually manipulated over the workpiece 12 or it may be mounted on a guide 16. A drive motor 18 causes the search unit 14 to travel back and forth across the guide 16 as the workpiece 12 advances through the inspection station 13. This will cause the search unit 14 to scan the workpiece 12 along a generally sinuous search pattern 20. It should be understood the search unit 14 and scan mechanism may be adapted to inspect flat elongated strips as illustrated, or any other type of workpiece and any type of search pattern may be followed.

The search unit 14 includes a pickup probe 22 which projects downwardly toward the workpiece 12 and is coupled to an oscillator 24 so as to receive a driving signal therefrom. The probe 22 is effective to radiate a magnetic flux field and generate eddy currents in the workpiece 12 in accordance with the driving signal. The probe 22 also includes means responsive to the eddy currents and effective to produce a secondary signal corresponding thereto. The probe 22 is coupled to an amplifier 26 which forms the input responsive to the secondary signal and effective to indicate the characteristics of the workpiece. As best seen in FIGS. 2 and 3 the probe 22 includes a central core 28. Although the core 28 may be of any desired variety, it is normally substantially cylindrical and its has been found advantageous to form the core 28 from a ferrite having a high magnetic permeability. A primary or driving winding 30 is wrapped concentrically around the core 28 whereby it produces a magnetic field axially of the core 28. This field also radiates outwardly beyond the opposite ends of the core 28.

The primary winding 30 is interconnected with the oscillator 24 and received the driving signal therefrom. Normally the driving signal is an essentially sinuous current having a frequency that may extend from a few cycles per second up to megacycles. The magnetic field produced by the probe 22 will be of the same frequency.

The search unit 14 normally positions the core 28 at substantially right angles to the surface with the end thereof spaced a short distance therefrom. At least a portion of the magnetic field extends into the workpiece 12 whereby eddy currents are generated within the workpiece 12. The characteristics of these currents (i.e. the size, shape and distribution of the current pattern as well as the magnitude, phase etc. of the currents) are determined by a large number of factors. The size of the core 28, its spacing from the surface of the workpiece 12 and the ampere-turns of the primary winding 30 are all important factors. However, the characteristics of the workpiece 12 are also very important. If the workpiece 12 is homogenous the currents will flow in an essentially circular pattern with the current being essentially symmetrical about the axis of the probe 22. However, if there are any discontinuities in the workpiece 12 adjacent the surface (for example variations in electrical resistance arising from surface cracks, inclusions, pitting etc.) the distribution, magnitude and/or phase etc. of the current will vary accordingly.

As the eddy currents circulate within the workpiece 12 they produce magnetic fields above the surface of the workpiece 12. These field, which extend into the core 28, are distorted in accordance with the distribution of the eddy currents. In order to sense the fields which extend into the core 28 and thereby determine the nature of the eddy currents, a secondary or pickup winding 32 may be wrapped around the core 28. This winding 32 is coupled to the reradiated field and the eddy current whereby it produces a corresponding electrical signal.

The signal produced by the secondary winding 32 includes a carrier having a frequency that is the same as the frequency of the driving signal from the oscillator 24. The amplitude of the carrier is a function of the magnitude of the eddy currents produced in the workpiece 12. If the area of the workpiece 12 being scanned by the search unit 24 is homogenous, the reradiated fields sensed by the core and secondary winding 32 is constant. Accordingly the amplitude of the secondary signal remains constant. As explained in more detail subsequently this constant level is normally zero or very close thereto.

If the search unit 14 passes over an irregularity in the workpiece 12, the amplitude of the carrier varies accordingly. The envelope of the carrier is therefore a function of the characteristics of the workpiece 12. More particularly the carrier is normally substantially zero and increases to some large amplitude while the probe is passing over a discontinuity. It can be appreciated that the sensitivity of the probe 22 is dependent upon the spacing between the probe 22 and the surface of the workpiece 12. When the spacing is small the magnetic field produces strong eddy currents and the secondary winding 32 is closely coupled thereto. As a consequence a strong signal is produced by the secondary winding 32. Conversely when the spacing increased the eddy currents decrease and a much weaker signal is produced in the secondary 32. In some types of testing such changes in sensitivity may be objectionable. Under these circumstances it is desirable to compensate for the variations.

One means of accomplishing this is to tune either the primary winding 30 and/or the secondary winding 32. For example, reactances such as the condensers 34 and 36 may be placed across each winding. When the probe 22 is closest to the workpiece 12 and the windings 30 and 32 are loaded by the proximity of the workpiece 12 the resonant frequency of the two windings 30 and 32 differs somewhat from the frequency of the driving signal from the oscillator 24. However, as the probe 22 moves away from the workpiece 12 the loading of the windings 30 and 32 by the workpiece 12 changes and the resonant frequency of the windings shifts toward the frequency of the oscillator 24. This causes several things to happen. First, of all, the driving current in the primary winding 30 increases thereby tending to increase the eddy currents. Secondly, because of the more nearly resonant conditions in the secondary winding 32 a given amount of reradiated flux in the core produces a larger secondary signal in the winding 32.

It can, therefore, be seen that by a proper choice of components, the resonant characteristics can be made to vary in exact opposition to the lift-off effect. As a consequence, within a limited range of movement of the probe 22 relative to the surface, the lift-off effect is compensated for and the probe 22 is substantially uniformly sensitive irrespective of the spacing. As previously stated, the output of the secondary coil 32 is coupled to the amplifier 26 forming the input to the system for processing the signals. This system also includes a demodulator 38 effective to remove the carrier from the amplified signal and leave only the envelope. This signal normally corresponds to the wave form shown in FIG. 4A. A differentiator 40 is provided to electrically differentiate the demodulated signal of FIG. 4A and produce a differentiated signal of FIG. 4B, which is a much shorter and sharper signal having a very high signal-to-noise ratio. The differentiated signal may be coupled through an amplifier 42 to a suitable alarm or other device, such as an oscilloscope 44, whereby an operator is informed of the characteristics of the workpiece 12.

The sensitivity and selectivity of the secondary or pickup coil 32 may be increased by winding it into a configuration which is very responsive to the reradiated flux fields at two spaced locations. There are a wide variety of possible configurations which may be employed. For example, the secondary 32 may include two separate coils or a single coil having two separate sections 46 and 48 which are separated slightly from each other.

To facilitate mounting of the sections 46 and 48 of the secondary 32 on the core 28, the core 28 may include one or more extensions 50 and 52 on its end. In the present embodiment these extensions 50 and 52 are formed by cutting the end of the core 28 and thereby forming a diametric channel 54 across the end of the core 28. As an alternative, a pair of semicylindrical members may have their ends slightly under cut. The two members are then bonded together to form a cylinder having a diametric slot or channel 54 in its end.

If the secondary 32 includes two separate coils, each coil may be provided on one of the extensions 50 and 52. However, it has been found one of the simplest arrangements is to wind the secondary 32 around the two extensions 50 and 52 and through the channel 54 in the form of a "figure 8" pattern It may be seen one section 46 of the coil 32 is thus mounted on the first extension 50 and closely coupled to the core 28, while the second section 48 is mounted on the second extension 52 and equally closely coupled to the core 28.

It may be appreciated with such an arrangement the two sections 46 and 48 are electrically and magnetically symmetrical with each other. The flux fields produced by the primary winding 30 and extending axially of the core 28 are equally divided between the two sections 46 and 48 of the coil 32. This induces substantially identical voltages in each section 46 and 48 of the secondary 32. These voltages oppose each other whereby the total voltage from the secondary 32 is zero. The secondary 32 is, therefore, completely decoupled from the primary winding 30 and no signals will be induced directly into the secondary winding 32. This permits the carrier wave in the secondary to be reduced to zero or substantially zero during normal operation.

Very frequently light fixtures, electric motors etc. in the vicinity of the system produce stray or ambient magnetic fields which pass through the core 28. The magnitude of this field passing through the two extensions 50 and 52 is substantially identical in each extension. As a result any voltages produced by the ambient field in sections 46 and 48 will be balanced whereby the secondary 32 is completely decoupled from the ambient field. As a result even though there may be a considerably amount of electrical machinery, relays, switches, transistor etc. in the vicinity of the probe, very little, if any noise will be generated in this secondary coil 32 and the carrier wave may be reduced to zero.

The foregoing balancing of the two sections 46 and 48 is true if the field is the same in both sections. However, if the probe is present in a flux field having an extremely high gradient there will be a material difference between the flux densities in the two extensions 50 and 52. An alternating magnetic field of this high gradient nature will produce asymmetric voltages in the two sections 46 and 58 whereby an output voltage is created by the secondary 32. It is only during such conditions that an output voltage is produced.

It may thus be seen if the search unit 14 is traveling across the surface of an essentially homogenous workpiece 12, the flux in the secondary 32 is balanced and little or no signal is produced. This is true even though a large current is flowing through the primary 30 and there are large eddy currents produced within the workpiece 12. However, in the event the search unit 14 carries the probe 22 across a discontinuity (for example a surface crack), localized distortions in the eddy current occur and the reradiated magnetic field has a very large gradient. The secondary 32 is unbalanced and a signal produced. This signal is coupled through the amplifier 26, the demodulator 38, the differentiator 40 and the amplifier 42 to the alarm 43 and/or oscilloscope 44. In order to utilize this system 10 for inspecting a workpiece 12, the workpiece 12 may be fed through the inspection station 13 while the search unit 14 is moved transversely of the workpiece 12. The probe 22 will thereby scan the surface of the workpiece 12 along the path 20. During this scanning the oscillator 24 circulates a high-frequency current through the primary winding 30 and produces a magnetic field axially of the core 28. This field passes from the end of the core 28 into the workpiece 12 and creates eddy currents in the workpiece 12.

Normally the workpiece 12 is essentially homogenous whereby the eddy currents are substantially symmetrical about the end of the core 28. The reradiated field is also essentially symmetrical and equally divided between the two sections 46 and 48 of the secondary 32. As a result there will be no signal produced by the secondary 32 and no discontinuities will be indicated on the oscilloscope 44 and/or alarm 43.

In the event the probe 22 approaches a discontinuity, such as a crack, the eddy currents produced by the primary 30 are distorted from their circular or symmetrical pattern, This in turn causes the reradiated field to be correspondingly distorted and to have a very high gradient in the area immediately adjacent to the discontinuity. Normally the circulation of the eddy currents is divided somewhat symmetrically about the discontinuity. As the probe 22 approaches a disturbed region adjacent a discontinuity, the portions of the reradiated field in the two sections 46 and 48 becomes increasingly unbalanced whereby a progressively increasing signal is produced in the secondary 32. At about the time the first extension 50 or 52 reaches the discontinuity, the amount of unbalance reaches a maximum and the signal is a maximum. As movement continues toward the discontinuity the signal decreases and when the diametric channel 54 is aligned with the discontinuity the fields on the opposite sides of the discontinuity and in the extensions 50 and 52 and coils 46 and 48 are identical and balanced. As a result, by this time, the signal has dropped to zero. After the channel 54 has passed over the discontinuity the portions of the field in the two extensions 50 and 52 again become unbalanced but in the reverse direction. Accordingly, the secondary 32 will again produce a signal which will increase until the probe 22 has moved beyond the region of the discontinuity. From then on the signal will decrease until it again reaches zero. It can thus be seen the signal from the secondary is an RF carrier having a frequency identical to that of the oscillator 24. The amplitude of this carrier is normally zero or very nearly zero but increases as the probe approaches a discontinuity and then very abruptly reverses itself with a very high rate of change as the channel passes over the discontinuity. This is particularly true when the channel 54 is parallel to a crack as it passes thereover.

The signal from the secondary 32 is amplified in the amplifier 26 and coupled into the demodulator 38. At this point the carrier frequency component is removed so as to recover a signal corresponding to the envelope. This signal corresponds to the signal of FIG. 4A and possesses a rapidly rising positive portion 53, an abrupt reversal 55 through zero, followed by a negative portion 56.

Figure 6:
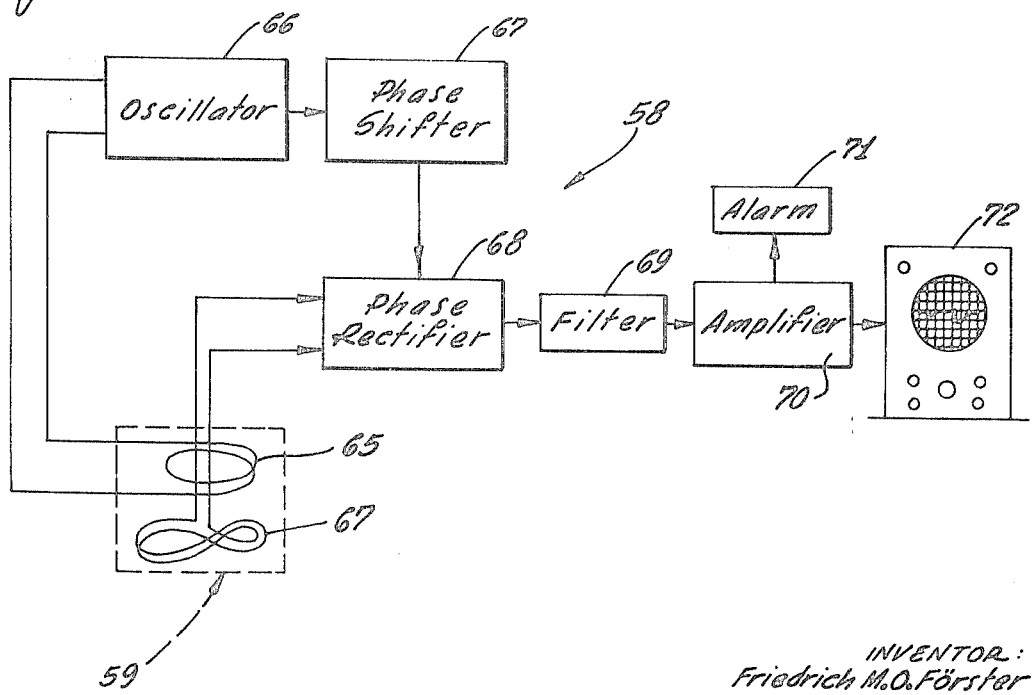
FIG. 6 is a block diagram of the system of FIG 5.

This signal is very sharp, i.e. has a very high rate of change. However, it has been found desirable to electrically differentiate the signal in the differentiator 40. This produces a signal having an amplitude corresponding to the rate of change of the original signal of FIG. 4A and resembles the signal of FIG. 4B. The signal is characterized by a very high amplitude, short duration pulse or spike 57. This corresponds to the rate of change during the rapid reversal 55 of the signal of FIG. 4A and is substantially coincident with the channel 54 passing over the discontinuity. The differentiated signal is then coupled through the amplifier 42 to the alarm 43 and/or oscilloscope 44. In this system 58 of FIGS. 5 and 6 a pickup probe 59 similar to any of the probes in any of the other embodiments is provided for scanning the workpiece 12 and producing a signal. The probe 59 may be scanned across a workpiece 12 such as a flat sheet by an suitable means. In the present instance one or more probes 59 are mounted upon a turntable 61 which is arranged generally parallel to the surface of the workpiece 12. The turntable 61 is mounted upon a drive shaft driven by a motor 62. This causes the probes 59 to travel across the surface of the workpiece 12. If the turntable 61 advances along the surface workpiece 12 or the workpiece 12 moves past the turntable 61 the probes 59 will scan the surface in a series of substantially uniformly spaced arcuate paths 63.

A rotary transformer 64 may be provided on the drive shaft to couple the probes 59 to the system 58 for processing the signals. Such a transformer 64 includes one or more coils that rotate with the turntable 61 and are connected directly to the probes 59. One or more stationary coils are inductively coupled to the rotating coils and directly connected to the system 58. This permits the transfer of the signals between a stationary structure and a rotating structure without any noise producing slip rings etc.

The primary winding 65 in the probe 59 is coupled to an oscillator 66 so as to be driven thereby. The "figure 8" secondary winding 73 is coupled to means for determining the secondary signals. In the present instance this includes a phase controlled rectifier 68. The rectifier 68, which may be of any conventional variety, is coupled to the oscillator 66 by means of a variable phase shifter 67. This is effective to "chop" or rectify the secondary signal in a predetermined relation to the phase of the driving signal. The "chopping" may be set to produce a secondary signal of maximum amplitude when the probe 59 is scanning over a discontinuity. Alternatively the "chopping" may be set to occur at an angle that is normal to the effects produced by variations in the spacing between the probe 59 and the workpiece 12. This will make the changes in the secondary signal independent of any lift-off effect and solely dependent upon discontinuities in the workpiece 12.

The output of the rectifier 68 is coupled to a filter 69 which is effective to improve the signal-to-noise ratio. This filter 69 is usually of the band-pass variety for removing the DC low-frequency and high-frequency components.

The output of the filter 69 is coupled to an amplifier 70 which is effective to increase the strength of the signal to a more useful level. An alarm 71 and/or oscilloscope 72 may be coupled to the amplifier 70. These are set so that the operator can easily determine when discontinuities appear under probe 59.

In order to utilize this system 58 the phase shifter 67 is usually set to provide a signal that is independent of the spacing between the probes 59 and the workpiece. If the portion of the workpiece being scanned is uniform and free of discontinuities the signal will remain constant. However, if the signal from the rectifier 68 will vary in amplitude. The change will be apparent on the oscilloscope 72 and/or cause the alarm 72 to indicate that a discontinuity is present.

As a further alternative the embodiment 80 of FIGS. 7 and 8 may be employed. This embodiment includes an inspection station 82 particularly adapted for inspecting substantially cylindrical members, such as wires, bars, pipes, tubes etc.

A spinning head or rotor 86 is mounted upon a stationary support 88 having an axial passage therethrough whereby an elongated workpiece 12 may be fed axially through the rotor 86 and the support 88. A search unit 84 is mounted upon the spinning head or rotor 86 and driven by suitable means, such as a motor. The search unit 84 includes a pickup probe 90 projecting radially inwardly from the rotor 86 whereby the surface of a workpiece is scanned along a spiral pattern.

The probe 90 includes a primary winding 91 coupled to an oscillator 96 similar to oscillator 66. The probe 90, therefore, radiates a magnetic flux field from its face and causes eddy currents to be generated within the workpiece 12. The probe 90 also includes a secondary winding 98 responsive to the magnetic field reradiated from the surface of the workpiece 12 and effective to produce a secondary signal corresponding toe the characteristics of the workpiece 12.

The secondary winding 98 is coupled to means which are responsive to the secondary signals and effective to indicate the characteristics of the workpiece 12. For example, although phase means, such as in FIG. 5 and 6, may be employed, in this embodiment it is coupled to an amplifier 100, demodulator 102, differentiator 104, amplifier 106, alarm 108 and/or oscilloscope 110 similar to the embodiment of FIG. 1.

As can best be seen in FIG. 8, the probe 90 includes a core 112 which may be fabricated from any suitable magnetic material having a high magnetic permeability. It has been found preferable to mold and/or machine the core 112 from a ferrite. The core 112 includes a back 114 having a center arm 116 and a pair of end arms 118 and 120 whereby the core 112 has a generally E-shaped configuration. The center arm 116 is divided in two by a channel 122 so as to form a pair of separate extensions 124 and 126. These correspond respectively to channel 54 and extensions 50 and 52 in the first embodiment.

The secondary or pickup coil 98 may be wrapped upon the center arm to form two separate sections 128 and 130 coupled respectively to the extensions 124 and 126. Although two separate coils may be employed it has been found preferable to wrap the secondary 98 in the form of a figure 8 whereby the two sections 128, and 130 are exactly equal and opposite. These sections 128 and 130, which are balanced against each other, are in turn coupled to the amplifier 100. The primary winding 91 may be wrapped around the entire core 112 or, as illustrated in this embodiment, it may includes two separate sections 92 and 94 which are mounted on the two end or outside arms 118 and 120. The two sections 92 and 94 are wound in the same direction whereby the fields emerging from the ends of the arms 118 and 120 are in phase with each other and have the same sense.

As the oscillator 96 energizes the primary winding 91 a flux field is radiated from a broad area or face corresponding to that defined by arms 118 and 120. Since all portions of this field are in phase and of the same sense, the lines of flux in the region adjacent to the center arm 116 will be substantially straight and uniformly distributed when they enter the workpiece. This insures the eddy currents generated in the workpiece 12 in the vicinity of the secondary coil 98 covering a substantial area and being substantially uniform.

In addition the end arms 118 and 120 tend to collimate the flux for a substantial distance from the center arm 116. As a result the density of the flux actually entering the workpiece 12 tends to remain substantially constant provided the spacing between the center arm 116 and the workpiece 12 is within this collimated range. Accordingly, the lift-off effect from this type of probe 90 is considerably reduced. If further lift-off compensation is desired, either the primary or secondary windings 91 and 98 may be tuned by the addition of suitable reactances corresponding to the condensers 34 and 36 in the first embodiments.

The secondary winding 98 is divided into two separate sections 128 and 130 by wrapping around the extensions 124 and 126 in a figure 8 configuration similar to secondary 32 in the first embodiment. As this probe 90 approaches, passes over and retreats from a discontinuity, the signals from the secondary 98, the demodulator 102, the differentiator 104 etc. will be very similar to the signals from the corresponding parts of the first embodiment. This probe 90 can detect extremely small defects in much the same manner as the probe of the first embodiment. Since the probe 90 is most sensitive to discontinuities parallel to the channel 122 the probe 90 should be oriented with the channel 122 generally parallel to the most common types of discontinuity. Toward this end the channel 122 may extend longitudinally of the probe 90 as shown, or it may be rotated 90° so as to extend transversely of the probe 90 similar to the probe in Figure 9.

As an alternative the embodiment of Figure 9 may be employed. This embodiment employs a pickup probe 132 very similar to the probe 90 in Figure 7. This probe 132 includes four separate slabs 134, 136, 138 and 140 of a magnetic material such as a ferrite. The slabs 134, 136, 138 and 140 are all substantially identical and parallel to each other.

This embodiment may be fabricated by wrapping a secondary 142 around the parallel center slabs 136 and 138. The secondary 142 may be a single coil wrapped in a figure 8 pattern. Alternatively, it may be two separate coils separately wrapped around the center slabs and in series opposition to form a balanced secondary. After secondary or pickup coil 142 has been wrapped around the two center slabs 136 and 138, two outside or using slabs 134 and 140 are placed adjacent the center slabs 136 and 138. A single primary winding 144 is then wrapped around all of the slabs 134, 136, 138 and 140 whereby a substantially uniform field may be produced across the face of the probe 132. It should be noted alternatively separate primary windings may be provided on the end slabs 134 and 140 similar to the preceding embodiments.

In order to utilize this embodiment the probe 132 may be mounted in a search unit for scanning the workpiece 12. The primary 144 is then coupled to an oscillator 146 and the secondary 142 coupled to an amplifier 148 forming the input to a suitable nondestructive testing system.

It can be appreciated although this embodiment is very similar to the embodiment of Figure 8, it possesses certain advantages, particularly in its fabrication. It may also be noted the spacing 139 between the two center slabs 136 and 138 is generally transverse to the length of the probe 132 rather than longitudinally. However, if desired, it may be longitudinal by rotating slabs 136 and 138 by 90°.

As an alternative the system may employ a probe similar to Figure 10. This probe 154 includes a core 156 fabricated from a magnetic material such as a ferrite having a high magnetic permeability. The core 156 includes a main body 158 having a plurality of arms projecting from the opposite sides thereof. In the present instance this includes a center arm 160 or 162 and a pair of end arms 164–166 or 168–169 on each side. This probe 154, therefore, has a "double E" shape resembling a pair of probes 90 placed back-to-back. In fact, as will become apparent, a pair of such probes 90 may be employed. The arms 160, 164 and 166 on one side of the probe 154 form a first face while the arms 162, 168 and 169 on the other side form a second face.

A secondary or pickup coil 170 is wrapped around the center arm 160 forming a part of the first face. This arm 160 is slotted and the secondary 170 wound in a figure 8 configuration substantially identical to the previously described arrangements. A primary winding is wrapped around the two end arms 164 and 166 forming the rest of the first face. This primary may be a single winding similar to winding 144 in Figure 9. However, in the present instance it is divided into separate parts 172 and 174 for each of the arms 164 and 166, respectively. The two parts 172 and 174 are interconnected substantially identical to the arrangement of Figure 8 whereby a collimated field is radiated from the first face of the probe 154.

The two parts 172 and 174 of the primary are connected together and coupled to a suitable oscillator 176 for driving the primary and producing eddy currents in the workpiece 12. The secondary 170 is coupled to an amplifier 178 which may be coupled to a suitable nondestructive testing system similar to that described in any of the foregoing embodiments. The gain of the amplifier 178 is a variable determined by the magnitude of the signal present on the gain control inputs 180. Accordingly the amplitude of the amplified signal present on the output 182 is a function of two factors. First of all it is a function of the amplitude of the signal from the secondary or pickup coil 170 which is determined by the magnitude of the eddy currents. Secondly it is a function of the signal on the control inputs 180 of the amplifier 178.

In addition a second primary winding may be wrapped around the two end arms 168, 169 on the second side of the core 156. In the present instance the primary winding is divided into two parts 184–186 and interconnected substantially identical to the two parts 172–174 of the first primary winding on the arms 164–166 respectively. These windings 184–186 are interconnected with each other and coupled to the oscillator 176 whereby they will cause a second magnetic field to be radiated from the second face. If the two faces are remote from any magnetic and/or conductive materials, the two fields will be substantially identical and the load presented by the windings will be identical. However, if the first face approaches a magnetic and/or conductive material, the field from that face and the load presented by the primary 172 and 174 will differ materially from the field from the second case and the load presented by the primary 184–186. Preferably the sets of primary windings 172–174 and 184–186 are coupled to the oscillator 176 by a pair of balancing resistors 190–192 so as to form a bridge. The oscillator 176 is connected to one pair of corners of the bridge whereby the junctions at the opposite ends of the resistors 190–192 form the second pair of corners 194. It will become apparent subsequently that instead of a bridge configuration the two sets of windings 172–174 and 184–186 may be arranged in a differential configuration with the oscillator driving the two of them in series opposition. A control voltage is then taken from the junction between the windings and applied to the control input 180.

If the core 156 is disposed remote from any disturbing materials (i.e., magnetic and/or conductive), the various primary windings 172–174 and 184–186 are all balanced against each other and there will be no output from the two corners 194 of the bridge. However, as the first face of the probe approaches the workpiece 12 the set of primary windings 172–174 are loaded by the materials of the workpiece and the reactance varies. The reactance of the second set of primary windings 184–186 remains substantially uneffected. As a consequence the bridge becomes unbalanced and a signal is produced between the opposite corners 194 of the bridge.

The magnitude of the unbalanced signal is shown in Figure 11. When the probe 154 is at a remote distance the amount of unbalancing is negligible and the output signal is nil. As the probe 154 approaches the surface of the workpiece the load on the primary 172–174 increases and the magnitude of the signal becomes progressively larger whereby an increasing signal is produced. This signal is coupled to the control input 180 of the amplifier 182 and reduces its gain, i.e. it functions as an automatic gain control.

As the spacing between the face of the probe 154 and the workpiece 12 decreases decreases the secondary 170 becomes progressively more sensitive to the fields reradiated from the surface of the workpiece 12. By a proper choice of components the increasing control signal may be made to reduce the gain of the amplifier 182 at the same rate as the sensitivity of the probe 154 increases. As a consequence the overall sensitivity of the entire system may be maintained substantially constant and virtually independent of the spacing between the probe and the surface.

If it is desired to utilize this probe 154 for measuring irregularities in the surface, roughness, eccentricity, etc. the foregoing arrangement can be reversed whereby the control signal causes the probe 154 to become extremely sensitive to variations in spacing. Thus, as the probe travels around the exterior of the workpiece, if the spacing varies an output signal will be produced such that the characteristic of the workpiece can be rapidly determined.

In all of the preceding embodiments the magnetic fields radiated from the core of the probe have been substantially normal to the surface of the workpiece. This type of field produces eddy currents circulating in planes parallel to the surface. Such a configuration is particularly useful in sensing discontinuities such as cracks disposed generally normal to the surface and extending inwardly towards the center of the workpiece. However, under some circumstances it may be desirable to locate discontinuities at substantially right angles to the foregoing, i.e. generally parallel to the surface of the workpiece. For example, it may be desirable to locate a discontinuity such as a lack of bonding between a plating on the surface of the workpiece, variations in the thickness of the plating, etc. Under these circumstances the embodiment of Figure 12 may be employed.

An embodiment of this nature produces a driving or radiated flux field having a direction essentially parallel to the surface of the workpiece 12. A field of this orientation generates eddy currents circulating in planes substantially normal to the surface of the workpiece and therefore, cutting across any discontinuities parallel to the surface. The discontinuities greatly disturb these eddy currents whereby large variations in the characteristic of the reradiated magnetic field are produced.

In this embodiment the probe 200 includes a core having an air gap arranged generally parallel to the surface of the workpiece. Although a single member may be employed, the present core includes two separate members 202–204 of a magnetic material. The members 202–204 are essentially circular magnetic rings such as frequently used for computer logic. One side of each ring is removed, such as by grinding. This forms open magnetic circuits having airgaps 206–208 between the adjacent faces. Any flux within the rings 202–204 extends circumferentially of the ring and across the gaps.

A separate secondary winding 210 and 212 is provided on each ring 202 and 204. These windings 210 and 212 are preferably on the opposite legs of the rings 202 and 204 whereby they do not interfere with each other. As a consequence the two rings may be very close to each other, i.e. they are separated by only one thickness of the winding 210 and 212 which is normally only the thickness of one wire.

After the two secondary windings 210 and 212 are provided on the ring members 202 204, a single primary winding 214 is wrapped around both members 202–204. This primary 214 may be coupled to a suitable driving oscillator 216 whereby annular magnetic flux fields extend circumferentially around the two ring members. The portions of the fields extending across the airgap 206 and 208 extend into the workpiece substantially parallel to the surface thereof and generate eddy currents which circulate in planes generally normal to the surface. Any variations in these eddy currents are sensed by the secondary winding and coupled into a suitable system for detecting the variations in the eddy currents. For example, the amplitude responsive system on the phase responsive system may be utilized.

It may be appreciated since the eddy currents are circulating at right angles to the surface they will be disturbed from their normal pattern by discontinuities generally parallel to the surface. Accordingly, this embodiment is particularly useful for determining variations in the thickness of a plating, the lack of bonding etc.

While only a limited number of embodiments are disclosed herein it will be readily apparent to persons skilled in the art that numerous changes and modifications may be made thereto without departing from the spirit of the invention. For example, the configurations of the cores, the windings etc. may be modified to fit any particular situation. Also the form of scanning, the type system employed to receive the signals from the secondary etc. may be adapted to identify the particular types of discontinuities that are of particular interest. Accordingly, the foregoing disclosure and description thereof, are for illustrative purposes only and do not limit the scope of the invention which is defined only by the claims which follow.

I claim:

1. A nondestructive testing system for inspecting the surface of a workpiece, said system including the combination of
a core of magnetically permeable material,
a first set of arms on one side of the core forming a first face for being disposed adjacent the surface of the workpiece,
a second set of arms disposed on the opposite side of said core and forming a second face opposite to said first face for being disposed remote from the surface of the workpiece,
a first primary winding on the first set of arms,
a second primary winding on the second set of arms,
a signal generator coupled to said primary windings, said signal generator providing a carrier frequency signal in said primary windings for producing magnetic flux fields which radiate from said faces, the field radiated from said first face being effective to produce eddy currents in said workpiece, the field radiated from said second face being substantially independent of said workpiece,
a secondary winding on one of the arms in said first set coupled to receive the magnetic fields reradiated from the eddy currents circulating in said workpiece,
variable gain means coupled to said secondary winding and effective to produce a signal corresponding to the eddy currents, and
control means coupled to said primary windings and responsive to the differences in said two primary windings produced by variations in the spacing between said first face and the surface of the workpiece, said control means being coupled to said variable gain means and effective to vary the gain thereof as the spacing between the first face and the surface of the workpiece varies.

2. The nondestructive testing system of claim 1 wherein the control means include means for interconnecting the primary windings into a bridge to provide a control signal which is a function of the unbalance of the bridge, the amount of said unbalance being a function of the spacing between said first face and the surface of the workpiece.

3. A pickup probe for use in an eddy current nondestructive testing system for inspecting the surface of a workpiece and including signal generator means and variable gain means, said pickup probe including the combination of
a core of magnetically permeable material,
a first set of arms forming a first face on one side of the core for being disposed adjacent to the surface of the workpiece,
a second set of arms forming a second face on the other side of the core for being disposed remote from the surface of the workpiece,
a first primary winding on said first set of arms for being coupled to said signal generator means and producing a first magnetic flux field which extends into said workpiece and produces eddy currents in the workpiece,
secondary winding means on at least one arm in said first set of arms for being coupled to the variable gain means, said secondary winding means being responsive to the fields reradiated by the eddy currents to provide a signal corresponding thereto,
a second primary winding on the second set of arms for being coupled to said signal generator means and producing a second magnetic flux field which is remote from said surface, and
said first and second primary windings being interconnected with each other to form a control signal which is a function of the spacing between the first face and the surface of the workpiece and is effective to vary the gain of the variable gain means in accordance therewith.

4. A nondestructive testing system for inspecting the surface of a workpiece, said system including the combination of
a core of magnetically permeable material,
a pair of end arms on one side of the core,
a center arm on said side disposed between said end arms, said arms forming a first face on said side of said core for being disposed adjacent the surface of the workpiece,
a pair of end arms and a center arm disposed on the opposite side of said core and forming a second face opposite to said first face for being disposed remote from the surface of the workpiece,
a first primary winding on the first pair of end arms,
a second primary winding on the second pair of end arms,
a signal generator for providing a carrier frequency signal, said signal generator being coupled to both of said primary windings on said core for producing magnetic flux fields which radiate from said faces, the field radiated from said first face being effective to produce eddy currents in said workpiece and the field radiated from said second face being substantially independent from the spacing between the first face and the surface of the workpiece,
said first center arm being divided into two separate portions adapted to be aligned with incremental areas on the surface of the workpiece,
a secondary winding on said center arm coupled to said separate portions so as to receive the magnetic fields reradiated from eddy currents circulating in said incremental areas,
variable gain means coupled to said secondary winding and effective to produce a difference signal corresponding to the differences between the eddy currents in said two areas, and
control means coupled to said primary windings and responsive to the differences in said two primary windings produced by variations in the spacing between said first face and the surface of the workpiece, said control means being coupled to said variable gain means and effective to vary the gain thereof as the spacing between the first face and the surface of the workpiece varies.

5. The nondestructive testing system of claim 4 wherein the control means include means for interconnecting the primary windings into a bridge to provide a control signal which is a function of the unbalance of the bridge, the amount of said unbalance being a function of the spacing between said first face and the surface of the workpiece.

6. A pickup probe for use in an eddy current nondestructive testing system for inspecting the surface of a workpiece and including signal generator means and variable gain means, said pickup probe including the combination of
a core of magnetically permeable material,
a pair of end arms on one side of the core,
a center arm on said side of said core disposed between said end arms, said arms forming a first face for being disposed adjacent the surface of the workpiece, said center arm being divided into two separate parts for being aligned with incremental areas on said surface,
a first primary winding on said end arms for being coupled to said signal generator means and producing a first magnetic flux field which extends into said workpiece and produces eddy currents in the incremental areas of the workpiece,
secondary winding means on said center arm coupled to the separate parts thereof to provide a difference signal corresponding to the difference between the eddy currents in the incremental areas, said secondary winding means being adapted to be coupled to the variable gain means,
a pair of end arms and a center arm on the opposite side of the core forming a second face for being disposed remote from the surface of the workpiece,
a second primary winding on the second end arms for being coupled to said signal generator means and producing a second magnetic flux field which is remote from said surface, and
said first and second primary windings being interconnected with each other to form a control signal which is a function of the spacing between the first face and the surface of the workpiece.